United States Patent
Paper et al.

(10) Patent No.: US 6,539,962 B2
(45) Date of Patent: Apr. 1, 2003

(54) HOLDING TANK CLEANING DEVICE

(76) Inventors: David M Paper, P.O. Box 53, Salyer, CA (US) 95563; Elizabeth J Paper, P.O. Box 53, Salyer, CA (US) 95563

( * ) Notice: Subject to any disclaimer, the term of this patent is extended or adjusted under 35 U.S.C. 154(b) by 134 days.

(21) Appl. No.: 09/840,215

(22) Filed: Apr. 23, 2001

(65) Prior Publication Data

US 2002/0174886 A1 Nov. 28, 2002

(51) Int. Cl.$^7$ ............................................... B08B 9/093
(52) U.S. Cl. ................................................ 134/169 R
(58) Field of Search .................... 134/166 R, 167 R, 134/168 R, 169 R, 110; 4/321, 322, 323

(56) References Cited

U.S. PATENT DOCUMENTS

| | | | |
|---|---|---|---|
| 3,095,001 A | * 6/1963 | Steltz | 134/167 R |
| 3,120,237 A | * 2/1964 | Lang | 134/167 R X |
| 3,897,599 A | * 8/1975 | Artzer | 134/167 R X |
| 4,013,225 A | 3/1977 | Davis | |
| 4,054,149 A | 10/1977 | Nelson | |
| 4,527,295 A | 7/1985 | Lacore | |
| 4,550,453 A | * 11/1985 | Norman | 134/166 R X |
| 4,667,351 A | 5/1987 | Williams | |
| 4,702,267 A | 10/1987 | Ashraff | |
| 5,203,361 A | 4/1993 | Tickle | |
| 5,417,460 A | 5/1995 | Lunder | |
| 5,573,187 A | * 11/1996 | Proctor | 134/167 R X |
| 5,613,510 A | 3/1997 | Proctor | |
| 5,642,746 A | 7/1997 | Sayce | |
| 5,647,090 A | 7/1997 | Yang | |
| 5,954,271 A | 9/1999 | Le | |
| 5,960,803 A | 10/1999 | Schmitz et al. | |

* cited by examiner

*Primary Examiner*—Philip Coe
(74) *Attorney, Agent, or Firm*—Michael I. Kroll (57) ABSTRACT

The present invention 10 discloses a device which can be used to remove waste material and debris from the holding tank 26 of a recreational vehicle 14. The present invention 10 comprises an outlet element 36 being T or Y-shaped having an end cap 34 on one end and a locking cap 38 on the other end which locking cap 38 connects by using a locking element to the tank coupling valve 22 of the recreational vehicle. An extension wand 32 which is connected to an inlet water hose 20 at the inlet hose coupling element 24 passes through O-rings 44 disposed in the end cap 34 and the locking cap 38 whereby the extension wand travels or passes into the inner area of the holding tank 26. The extension wand 32 has water outlet perforations 35 on its end which are disposed interior of the holding tank so as to disperse the pressurized fluid throughout the inner tank. The waste material then exits through a filter means 46 disposed in the locking cap 38 and then through the outlet element 36 and into the outlet hose 18 which is thereafter connected to a septic tank which receives the waste material from the interior of the holding tank 26.

17 Claims, 7 Drawing Sheets

HOLDING TANK CLEANING DEVICE

BACKGROUND OF THE INVENTION

Field of the Invention

The present invention relates generally to a waste containment-cleaning device and, more specifically, to a waste containment-cleaning device that may be selectively attached to a recreational vehicle in order to clean and maintain a recreational vehicle holding tank. The present invention is a holding tank cleaning device having a selectively attachable septic tank coupling adapter, and having a selectively extendable retractable water extension wand. The holding tank cleaning device consists of a water hose extension wand, one rubber gasket O-rings, a locking element, a locking cap, an outlet element, a locking band, an end cap, an intake hose coupling element, and an outlet hose having a septic tank coupling adapter at one of its distal ends. The water extension wand is an elongated cylindrical shaped flexible structure having an orifice extending through the length thereof. The water extension wand is furnished with a series of perforations at one of its distal ends and an intake hose-coupling element at the other distal end. The water extension wand provides the means for delivering pressurized fluids into a recreational vehicles holding tank. Also the water extension wand may receive its pressurized fluid load via a water hose that may be coupled to the intake hose-coupling element. The water extension wands perforations located at one of its distal ends provides the means for projecting a pressurized fluid load in various directions in order to access and clean hard to reach sections of a recreational vehicles holding tank. The intake hose coupling device is an adaptive fitting that provides the means for the water extension wand to be selectively coupled to pressurized water hose adapter. The rubber gasket o-rings resembles that of a conventionally manufactured rubber gasket o-rings. The rubber gasket O-rings provides the means for a leak resistant seal around the water extension wand as it slides through the end cap and the locking cap. The rubber gasket O-rings are located one in the locking cap and the other in the end cap. The locking element is an interfacing mechanism which provides the means for coupling to a recreational vehicles holding tank waste outlet valve. The locking element is located on the locking cap and is fixed thereon. The locking cap is a cup shaped structure having an aperture and a filter therein. Also the locking cap provides the means for retaining the components within said invention as it works in conjunction with the outlet element and the end cap. The locking cap is located at one of the distal ends of the outlet element. The outlet element is a T-shaped cylindrical embodiment having a hollow interior and a thin gauged wall. The outlet element provides the housing means for the water extension wand. The outlet element having three ends is coupled to the front cap at one of it ends, coupled to the end cap at yet another end, and coupled to the outlet hose at the other end. The outlet element provides transfer medium for waste material as it is cleaned out of a holding tank and travels down the outlet hose. The end cap is a modified cup shaped structure having an aperture therein. The end cap provides the retaining means for the components that comprise said invention when used in conjunction with the outlet element and the locking cap. Also the end cap provides supportive means for the water extension wand as it traverses through the aperture of the end cap, through the outlet element and through the aperture of the locking cap. The locking band resembles that of a conventional selectively adjustable band clamp and provides the coupling means for the outlet hose and the outlet element. The outlet hose is a high pressure drainage hose fitted with a conventional septic tank coupling adapter at one of its distal ends and having said invention coupled to the other distal end. The outlet hose provides the sewage evacuation means for the holding tank of a recreational vehicle. The user of said invention may selectively attach said invention to the outlet valve of a recreational vehicles holding tank. The user of said invention may then introduce pressurized water into the holding tank via a water hose as it works in conjunction with the water extension wand. The water extension wand protrudes from the locking cap and is interfaced with the inner cavity of the recreational vehicle holding tank. A volume of pressurized water is forced into the inner cavity of the recreational vehicle holding tank and it forced out of the tank via the locking caps. The waste matter from the holding tank is the flushed through the outlet element, then in turn flushed down the outlet hose and into a sub-level or other type of septic tank.

Description of the Prior Art

There are other cleaning devices designed for cleaning and maintaining recreational vehicle holding tank. Typical of these is U.S. Pat. No. 4,013,225 issued to Davis on Mar. 22, 1977.

Another patent was issued to Nelson on Oct. 18, 1977 as U.S. Pat. No. 4,054,149. Yet another U.S. Pat. No. 4,527,295 was issued to Lacore on Jul. 9, 1985 and still yet another was issued on May 26, 1987 to Williams as U.S. Pat. No. 4,667,351.

Another patent was issued to Ashraff on Oct. 27, 1987 as U.S. Pat. No. 4,702,267. Yet another U.S. Pat. No. 5,203,361 was issued to Tickle on Apr. 20, 1993. Another was issued to Lunder on May 23, 1995 as U.S. Pat. No. 5,417,460 and still yet another was issued on Mar. 25, 1997 to Proctor. as U.S. Pat. No. 5,613,510. Yet another U.S. Pat. No. 5,642,746 was issued to Sayce on Jul. 1, 1997. Another was issued to Yang on Jul. 15, 1997 as U.S. Pat. No. 5,647,090 and still yet another was issued on Sep. 21, 1999 to Le as U.S. Pat. No. 5,954,271. Yet another U.S. Pat. No. 5,960,803 was issued to Schmitz on Oct. 5, 1999.

U.S. Pat. No. 4,013,225

Inventor: J. C. Davis

Issued: Mar. 22, 1977

An extension spray gun comprising a plurality of hollow pole sections telescopically secured together to form an extendable pole having a spray nozzle secured to one end of the pole and a valve secured to the other end of the pole to control flow of paint through a flexible hose extending between the valve and the nozzle. Paint is delivered from the hose to a chamber formed in the nozzle and flows through a passage in the nozzle to a spray tip. A valve element in the chamber is spring urged to close the passage when pressure of paint in the chamber is less than the predetermined pressure.

U.S. Pat. No. 4,054,149

Inventor: Wray H. Nelson

Issued: Oct. 18, 1977

Apparatus for storing a recreational vehicle sewer hose assembly comprising spaced cone members affixed to a central aperture mandrel with one cone element being slidably received respective to the mandrel and to the remaining fixed cone element. The mandrel is aperture and has an inlet end which can be connected to a water supply that the slidable cone can be removed from the mandrel, a sewer hose assembly telescopingly received in a collapsed manner about the mandrel, and the slidable cone member replaced upon the mandrel with the collapsed sewer hose being captured so that it is in stored relationship therebetween. During the above manipulation, water flow into the mandrel and through the apertures to wash any accumulation of sewage from the interior of the hose assembly. This expedient enables the entire apparatus to be subsequently drained so that the entire combination can be conveniently handled and stored in a sanitary and compact manner.

U.S. Pat. No. 4,527,295

Inventor: Brian C. Lacore

Issued: Jul. 9, 1985

A tank flushing apparatus designed in particular to be utilized in conjunction with a toilet waste holding tank. The tank flushing apparatus includes a connector assembly to facilitate attachment to a hose which in turn extends from a source of liquid, such as water. The connector assembly is attached to an elongated conduit, the inner end of which is formed into a nozzle assembly. The nozzle assembly extends through a hole formed within the holding tank and is constructed also to form a liquid type connection with the tank. The nozzle assembly includes a nozzle tip which disperses streams of water at various angles of inclination within the holding tank so as to achieve even dispersement of the liquid for the purpose of the dislodging and moving solid waste matte contained within the tank to then be moved through the drain conduit and discharged exteriorly of holding tank at a desired location.

U.S. Pat. No. 4,667,351

Inventor: Frank M. Williams

Issued: May 26, 1987

A spray flushing attachment for a vehicle holding tank, installed during initial manufacture or subsequently installed, is used to effectively and thoroughly clean out a vehicle holding tank, during the emptying of the holding tank. It is positioned in part through a hole in a holding tank end wall and secured from the outside, at a location opposite to the end wall, in which a standard holding tank drain has been factory installed. When cleaning water under pressure is supplied through a hose to standard PVC pipe fittings attached to spray flushing attachment, its interior horizontally diverting spray nozzle pointed toward the drain creates a wide spray across the bottom of this vehicle holding tank, which effectively cleans out the tank so no residue remains. The pressurized water flowing through the nozzle expands laterally while confined between widening arcuate nozzle sides which are covered above and left open below, and the cover terminates at a horizontal level matching the bottom of the nozzle entry orifice. The flushing attachment at its outside end has a projecting portion, matching standard available one half inch diameter PVC pipefittings. In between these ends is an integral circular hollow housing which fits in a hole especially made in the holding tank. Adjacent to this housing is an integral external flange, inclusive of an O-rings, which is secured to the holding tank exterior to firmly position all the portions of the entire spray flushing attachment.

U.S. Pat. No. 4,702,267

Inventor: M. Ahmed Ashraff

Issued: Oct. 27, 1987

This invention provides a fluid-conducting device suitable for rinsing the interior of the bottom of pesticide containers. The device comprises a body having opposed ends with a fluid passage in the body, fluid inlet means in communication with a passage at one end of the body, container rupturing means at the other end of the body and extending therefrom and an abutment means separating the body from the container rupturing means. The fluid passage in the container rupturing means is in communication with the passage of the body, and the fluid discharge means in the container rupturing means is in communication with the fluid passage of the body. When the container is inverted and the container rupturing means is inserted into the bottom of the pesticide container to the stop provided by the abutment means, the fluid discharge means is disposed just slightly below the bottom of the container and is effective to discharge the fluid primarily against the interior of the bottom of the container.

U.S. Pat. No. 5,203.361

Inventor: David P. Tickle

Issued: Apr. 20, 1993

A cleaning and storage implement for cleaning and storage sewer hoses used to discharge the contents of holding tanks of recreational vehicles. An elongated plastic tube has a length and first and second ends, with a water supply conduit fitting on the first end and a nozzle that sprays in a conical spray pattern on the second end. An adjustable positionable stop on the tube near the first end in the form of a disk has a hole sized so as to receive the tube in an adjustable friction fit. A handgrip on the tube is located between the fitting and the stop, and a retainer hook on the tube is located near the second end. A compressible hose may be cleaned and stored by connecting a cleaning water supply conduit to the first end of the tube, supplying water through the tube from the supply while passing the second end of the tube into a first end of the hose to clean the hose by a spray of water from the nozzle at the second end of the tube. The hose is compressed against the stop, and upon compressing the hose to a length comparable to the distance between the stop and the retainer, the second end of the hose is retained with the retainer hook.

U.S. Pat. No. 5,417,460

Inventor: Dennis Lunder

Issued: May 23, 1995

An apparatus for attaching and securing a drain hose to the adapter used with a recreational vehicle (ARV@) waste drain assembly or, at the opposite end of the hose, to a sewer fitting used in conjunction with a septic tank or some other type of in or above ground sewer system for receiving drained waste matter. The apparatus comprises a retaining ring, which may include an annular flange formed along on edge, slidably mountable inside the opening at one end of a RV drain hose, for retaining the shape and requisite diameter dimension of the end section of the hose to facilitate its engagement with the adapter or the sewer fitting when those connections are made. The ring is removed a before the adapter or the sewer fitting engages the hose opening to enable the hose to contract and form a tight seal with those components.

U.S. Pat. No. 5,613,510

Inventor: Ronald E. Proctor

Issued: Mar. 25, 1997

A system for cleaning an interior of a holding tank particularly in recreational vehicles. The apparatus includes a holding tank for retaining fluids and a fluid distribution assembly which extends through the tank for dispensing pressurized fluid against an interior thereof. The fluid distribution assembly comprises a main fluid conduit which is connected to a plurality of lateral conduits by a series of vertical conduits and upper and lower T-connectors. The lateral conduits have openings positioned along the body of the conduits and at least one opening at each outer distal end of the conduits. The opening in the conduits allow a pressured spray of fluid like water to be released from the holding tank.

U.S. Pat. No. 5,647,090

Inventor: Sung Hwa Yang

Issued: Jul. 15, 1997

A comprehensive diverse nonleaking cleaning apparatus consists of a cleaning portion that sprays water and cleaning fluid while receiving waste products of the spray fluid, a waste discharge device that temporarily stores and discharges waste collected from the cleaning portion, and a high pressure hose for spraying fluid therein attached to the cleaning portion and to a blow out motor pump. The apparatus sprays a mixture of water and cleaning fluid and simultaneously retrieves and temporarily stores the waste (including the original spray content) by means of an added pressure hose connected to a motor pump. The lavatory embodiment, usable by individuals with limited movement, such as elderly, disabled, bedridden patients etc., has a toilet seat portion for a human to sit on and discharge waste into that receives water and cleaning fluid sprayed from a hose of the cleaning portion onto the human to clean the human, and circulates under the toilet seat to cleans the human's buttocks and anus, break the bodily waste and transmit it to the waste intake path connecting to the waste discharge device. Other embodiments, in which the cleaning portion is formed of two tubes, one within the other, are suitable for cleaning walls, ceilings, floors in factories or roads as well as for cleaning the bottom of rivers and reservoirs. The nonleakage feature increases the diversity and efficiency, lowers the cost of cleaning everywhere and has environmental advantages.

U.S. Pat. No. 5.954.271

Inventor: Minh Quang Le

Issued: Sep. 21, 1999

A reduced size tank cleaning machine that has an impeller rotated by an inlet stream is disclosed. The impeller turns a shaft connected to a sealed planetary gear train that causes the tank cleaning machine to rotate about an axis, and this rotation causes a set of nozzles to rotate about a second axis. The fluid from the inlet stream exists through a port located between the impeller and the gear train and through the spray nozzles. Thus, the planetary gear train drives the tank cleaning machine about a first axis and a second axis. The design disclosed is preferably constructed so that it can be inserted into an opening that is about three inches (3.00"= 76.2 mm) in diameter. Methods of cleaning vessels are also disclosed.

U.S. Pat. No. 5,960,803

Inventor: Peter J. Schmitz

Issued: Oct. 5, 1999

A method of using a device for use in cleaning septic tanks, comprising a rotatable blade for breaking up the scum layer within a septic tank, power drive for turning the blade with sufficient power to break up the scum, and driveshaft for operably connecting the blade to power drive. The device can be used as a septic tank agitator, in order to liquefy the scum, liquid and sludge components within the tank, within a period of time far shorter than the traditional method of back-flushing to disrupt the layer.

While these waste cleaning and removal devices may be suitable for the purposes for which they were designed, they would not be as suitable for the purposes of the present invention, as hereinafter described.

SUMMARY OF THE PRESENT INVENTION

The present invention discloses a device which can be used to remove waste material and debris from the holding tank of a recreational vehicle. The present invention comprises an outlet element being T or Y-shaped having an end cap on one end and a locking cap on the other end which locking cap connects by using a locking element to the tank coupling valve of the recreational vehicle. An extension wand which is connected to an inlet water hose at the inlet hose coupling element passes through O-rings disposed in the end cap and the locking cap whereby the extension wand travels or passes into the inner area of the holding tank. The extension wand has water outlet perforations on its end which are disposed interior of the holding tank so as to disperse the pressurized fluid throughout the inner tank. The waste material then exits through a filter means disposed in the locking cap then through the outlet element and into the outlet hose which is thereafter connected to a septic tank which receives the waste material from the interior of the holding tank.

A primary object of the present invention is to provide a waste containment cleaning device that may be used on recreational vehicles holding tanks.

Another object of the present invention is to provide a waste containment cleaning device that may have selectively attachable coupling means for the coupling with a sub-level septic tanks inlet valve.

Yet another object of the present invention is to provide a waste containment cleaning device that may be operational without the presents of chemicals.

Additional objects of the present invention will appear as the description proceeds.

The present invention overcomes the shortcomings of the prior art by providing a waste containment cleaning device that is in expensive, light weight, easy to manipulate, selectively attachable to recreational vehicles (i.e. trailer, travel units and some mass-passenger vehicles).

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

With regard to reference numerals used, the following numbering is used throughout the drawings.

10 present invention
12 user
14 vehicle
16 side of vehicle
18 outlet hose
20 water inlet hose
22 holding tank coupling
24 intake hose coupling
26 holding tank
28 inflow
30 outflow
32 extension wand
34 end cap
35 perforation
36 outlet element
38 end cap
40 locking element
42 locking band
44 O-ring
46 filter aperture

DESCRIPTION OF THE PREFERRED EMBODIMENT(S)

In order that the invention may be more fully understood, it will now be described, by way of example, with reference to the accompanying drawings in which FIGS. 1 through 7 illustrate the present invention being a recreational vehicle holding tank cleaning device.

Figure 1:
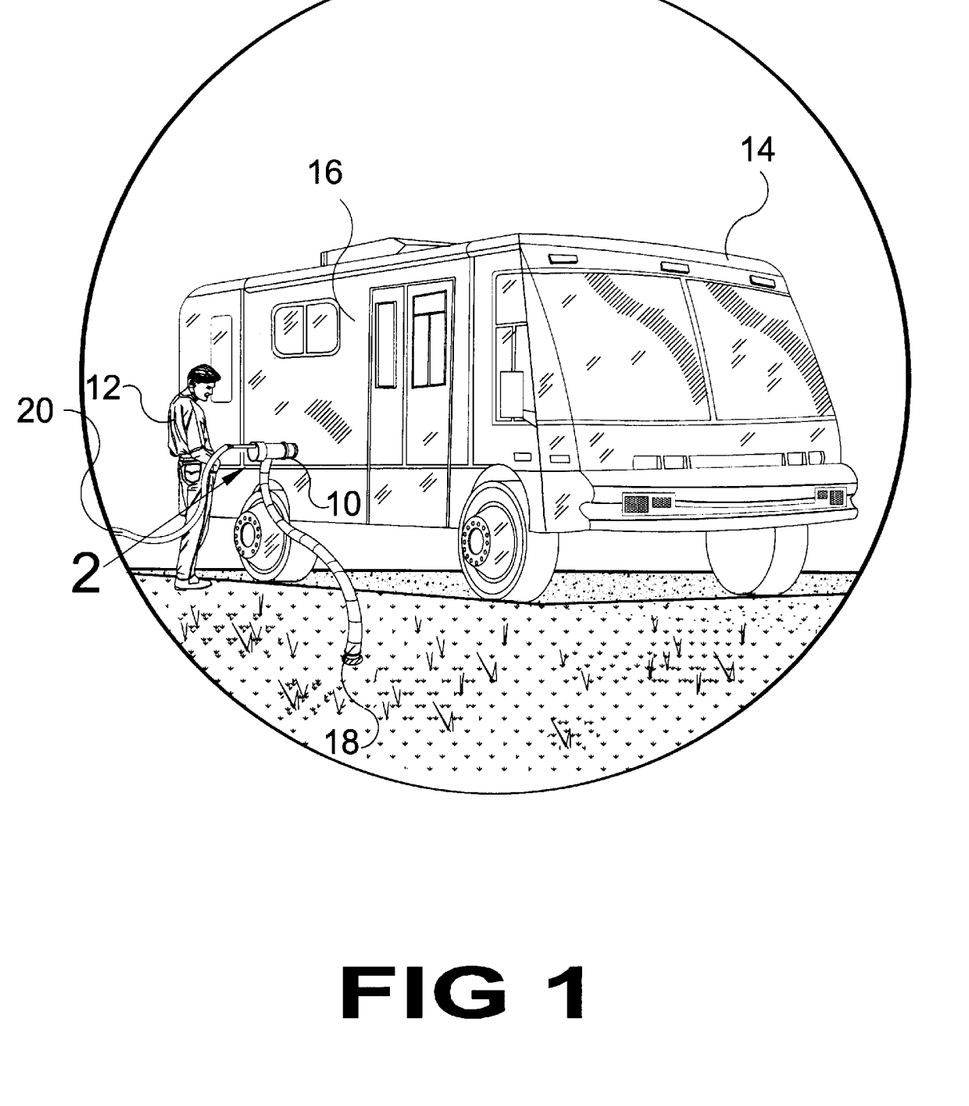
FIG. 1 is a perspective view of the present invention. Shown is an individual monitoring a recreational vehicle having a holding tank cleaning device selectively coupled to it side hull. Also shown is the outlet hose of said invention as it is selectively coupled to a sub-leveled septic tank. Shown also is a water hose coupled to said invention. Also shown is the ideal component set up aspect of said invention in order to perform its proper function as it seems fit.

Turning to FIG. 1, shown therein is a perspective view of the present invention 10 in operative connection. Shown is an individual 12 monitoring a recreational vehicle 14 having a holding tank cleaning device 10 selectively coupled to it side hull 16. Also shown is the outlet hose 18 of the present invention 10 as it is selectively coupled to below ground or sub-level septic tank (not shown). Shown also is a water hose 20 coupled to the present invention 10. Also shown is the ideal component connection manner of the present invention 10 in order to perform its proper function.

Figure 2:
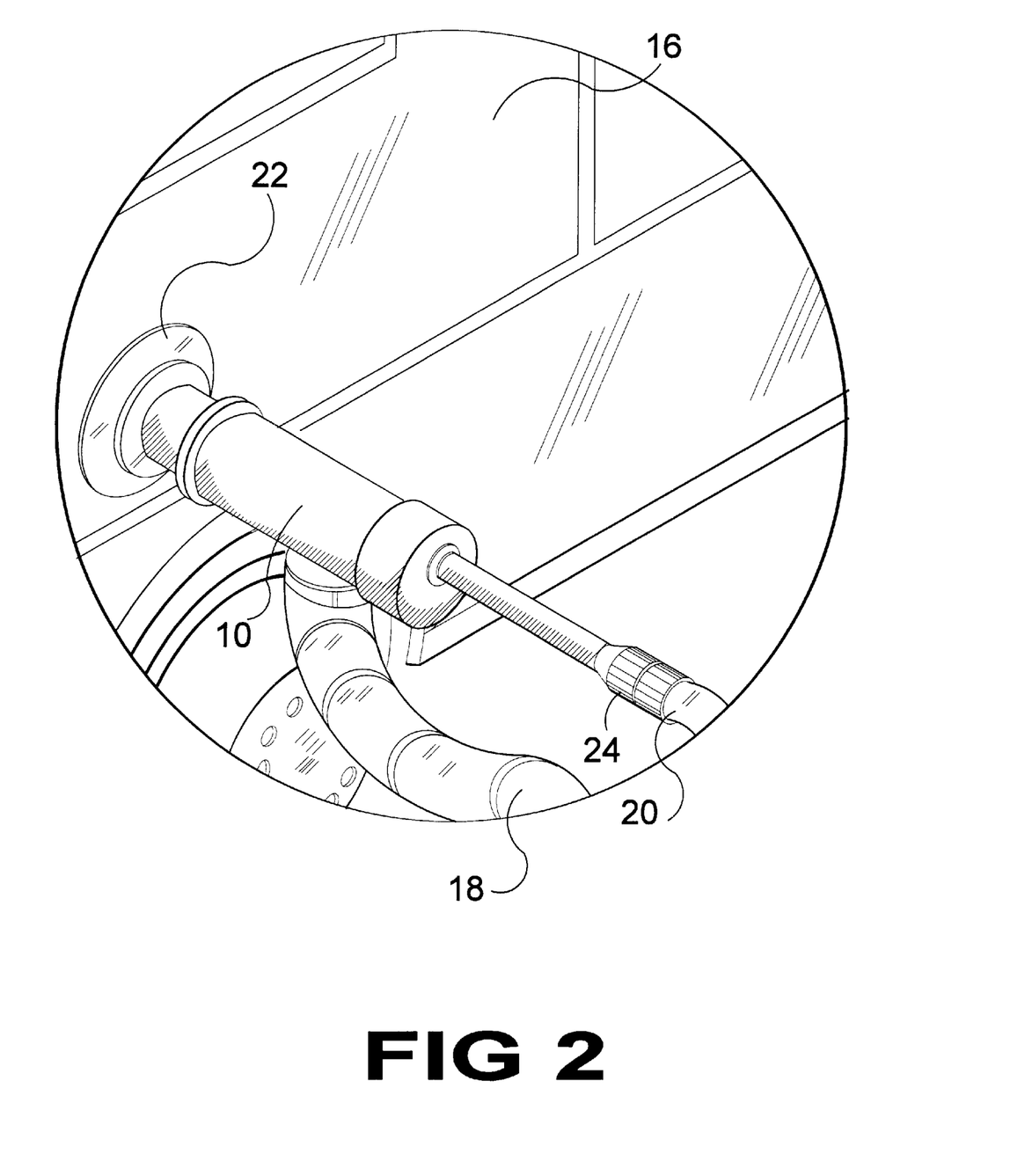
FIG. 2 is a perspective view, taken from FIG. 1 as indicated. Shown is the holding tank cleaning device as it is selectively attached to a holding tanks outlet valve. Also shown is the mating relation between intake hose and the intake hose coupling element. Shown also is the outer hull of a recreational vehicle for displacement related references between said invention and a recreational vehicles holding tank.

Turning to FIG. 2, shown therein is a perspective view, taken from FIG. 1 as indicated. Shown is the holding tank-cleaning device 10 as it is selectively attached to a holding tank outlet valve or coupling extension 22. Also shown is the mating relation between inlet hose 20 and the inlet hose-coupling element 24. Shown also is the outer hull 16 of a recreational vehicle for displacement related references between the present invention 10 and a recreational vehicle holding tank. An outlet hose 18 is also shown.

Figure 3:
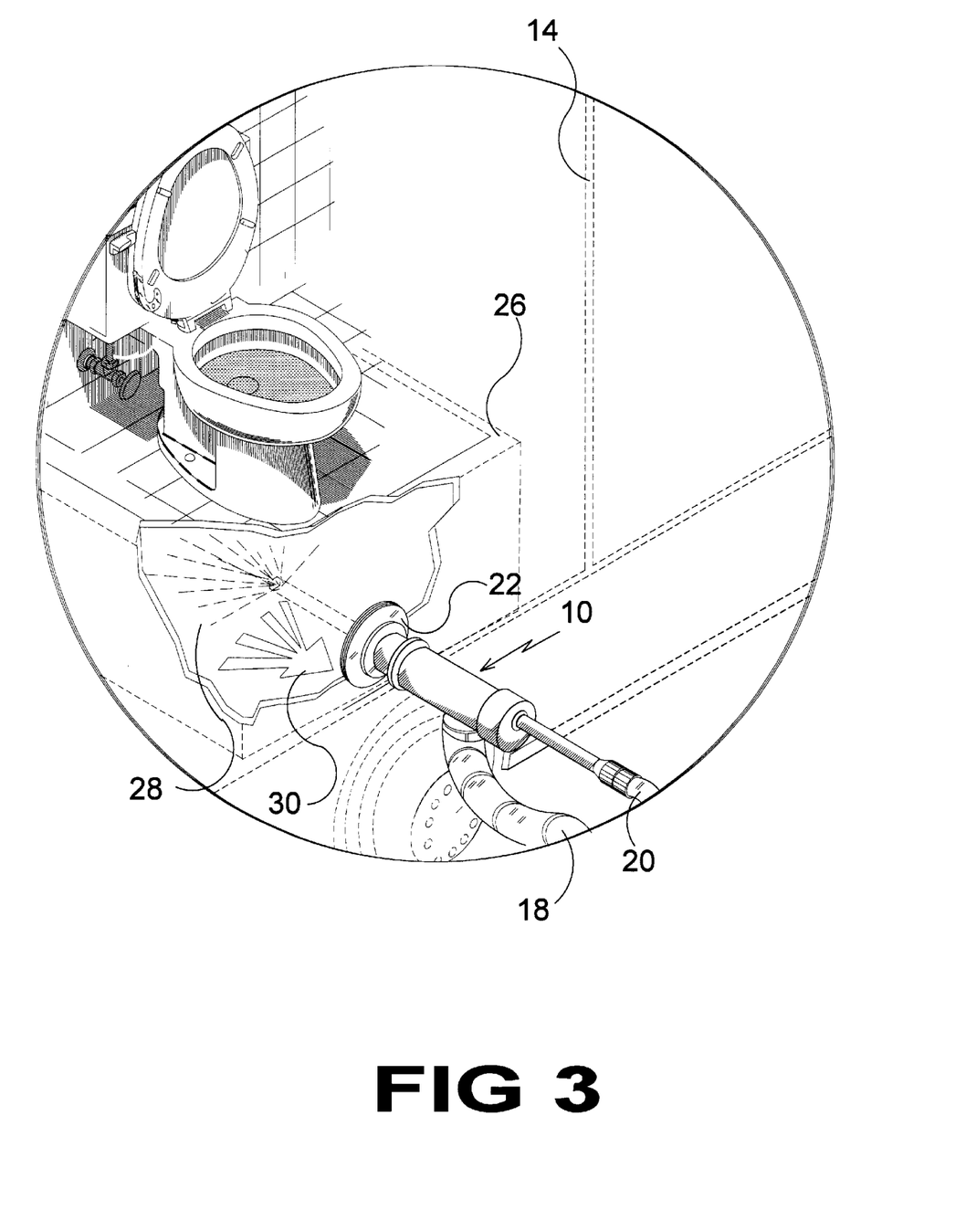
FIG. 3 is a perspective view, shown is recreational vehicles holding tank as it may appear inside of a recreational vehicle. Also shown is the ideal functioning aspect of said invention. Shown also is the flow pattern of the pressurized fluid as it infiltrates the holding tank and then is excavated from the said holding tank.

Turning to FIG. 3, shown therein is a perspective view, showing a recreational vehicle holding tank 26 as it may appear inside of a recreational vehicle 14. Also shown is the ideal functioning aspect of the present invention 10. Shown also is the flow pattern of the pressurized fluid as it enters at 28 the holding tank 26 and exits at 30 from the holding tank. The inlet hose 20 and outlet hose 18 are also shown.

Figure 4:
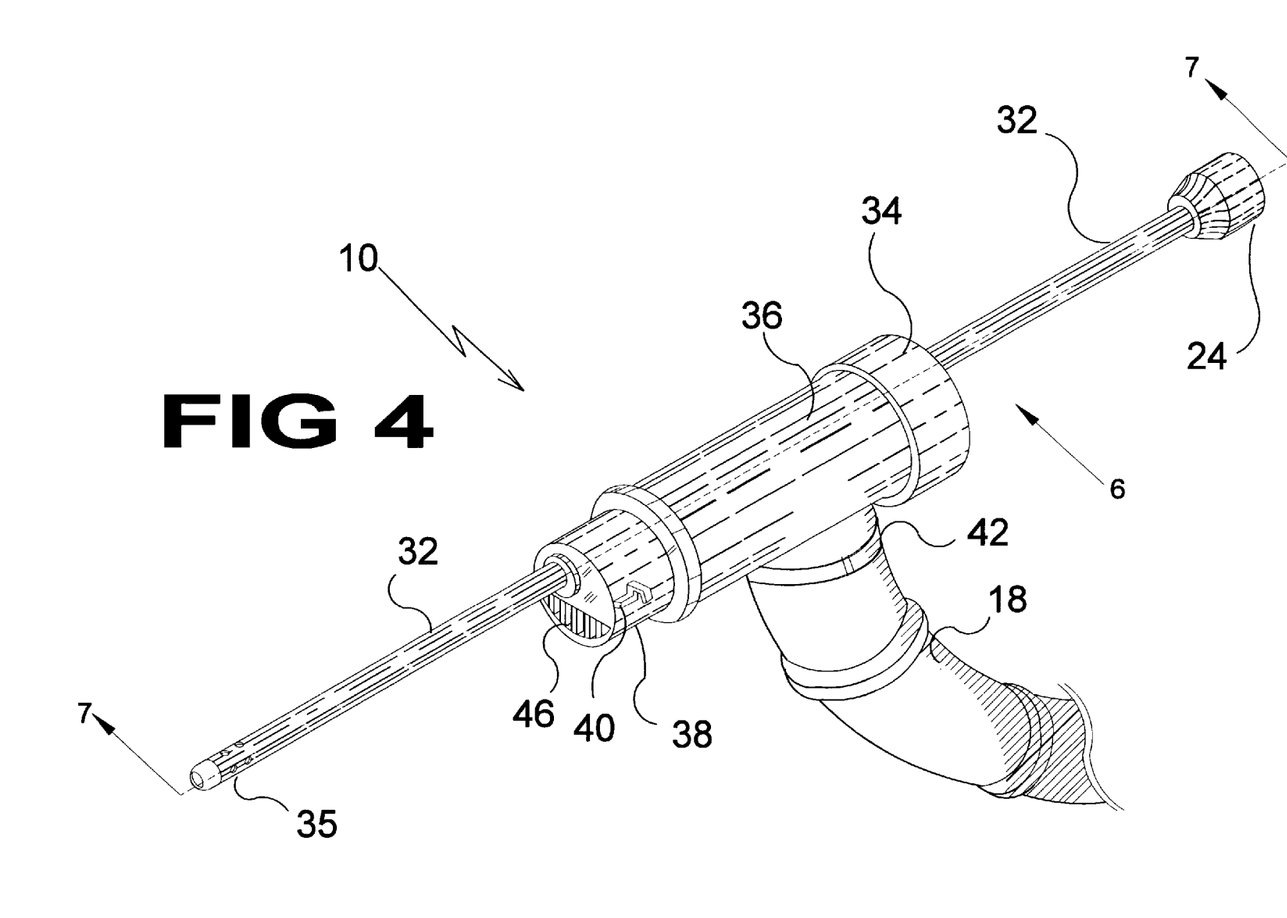
FIG. 4 is a perspective view, shown is the linear displacement relations between several of the intricate components that comprise said holding tank cleaning device. Also shown is the ideal shape of said invention in order to perform it functional aspect as it seems fit.

Turning to FIG. 4, shown therein is a perspective view, showing the components that comprise the holding tank cleaning device 10. Also shown is the ideal shape of the present invention in order to perform it functional aspect. Shown therein is the inlet hose coupling element 24 which is an adaptive fitting that provides the means for the water extension wand 32 to be selectively coupled to a pressurized water hose (not shown). The water extension wand is an elongated, cylindrically-shaped, flexible structure having a bore extending therethrough. The water extension wand 32 is equipped with a series of perforations 35 on its distal end which is placed inside the holding tank (not shown) and further has an intake hose coupling element 24 at its other end. The water extension wand 32 provides a means for delivering the pressurized flow of fluid into a recreational vehicle holding tank. Also the water extension wand may receive its pressurized fluid load via a water hose (not shown) that may be coupled to the intake hose coupling element 24. The water extension wand 32 has perforations 35 located at one of its distal ends which provides a means for projecting the pressurized fluid flow in various directions in order to access and clean hard to reach areas of the holding tank of the recreational vehicle. Also shown is end cap 34 which is a modified cup-shaped structure having an aperture therein. The end cap 34 provides a retaining means for the components that comprise the present invention when used in conjunction with the outlet element 36 and the locking cap 38. Also, the end cap provides supportive means for the water extension wand 32 as it traverses through the aperture of the end cap 34, then through the outlet element 36 and through the aperture of the locking cap 38. Also shown on locking cap 38 is the locking element 40 which is an interfacing device which provides a means for coupling to a recreational vehicle holding tank waste outlet valve 22. The locking element 40 is disposed on the locking cap 38 and is fixedly attached thereto. The locking cap 38 is a cup-shaped structure having an aperture and a filter 46 therein. Also the locking cap 38 provides a means for retaining the components within the present invention as it works in conjunction with the outlet element 36 and the end cap 34. The locking cap 38 is located at one of the distal ends of the outlet element 36. The outlet element 36 is a T or Y-shaped or like 3-way cylindrical element having a hollow interior and a thin gauge wall. The outlet element 36 provides a housing means for the water extension wand 32. The outlet element 36 has three ends thereon and is coupled to the locking cap 38 at one of its ends and is coupled to the end cap 34 at one of its other end and is coupled to the outlet hose 18 at its other end. The outlet element 36 provides transfer means for waste material as it is cleaned out of a holding tank and travels through the outlet hose 18. Also shown is a locking band 42 which resembles a conventional, selectively adjustable band clamp and provides the coupling means for the outlet hose 18 to the outlet element 36. The outlet hose 18 is a high pressure drainage hose fitted to a conventional septic tank coupling adapter at one of its distal ends and is coupled to the present invention 10 at its other end. The outlet hose 18 provides a sewage evacuation means for the holding tank of a recreational vehicle.

Figure 5:
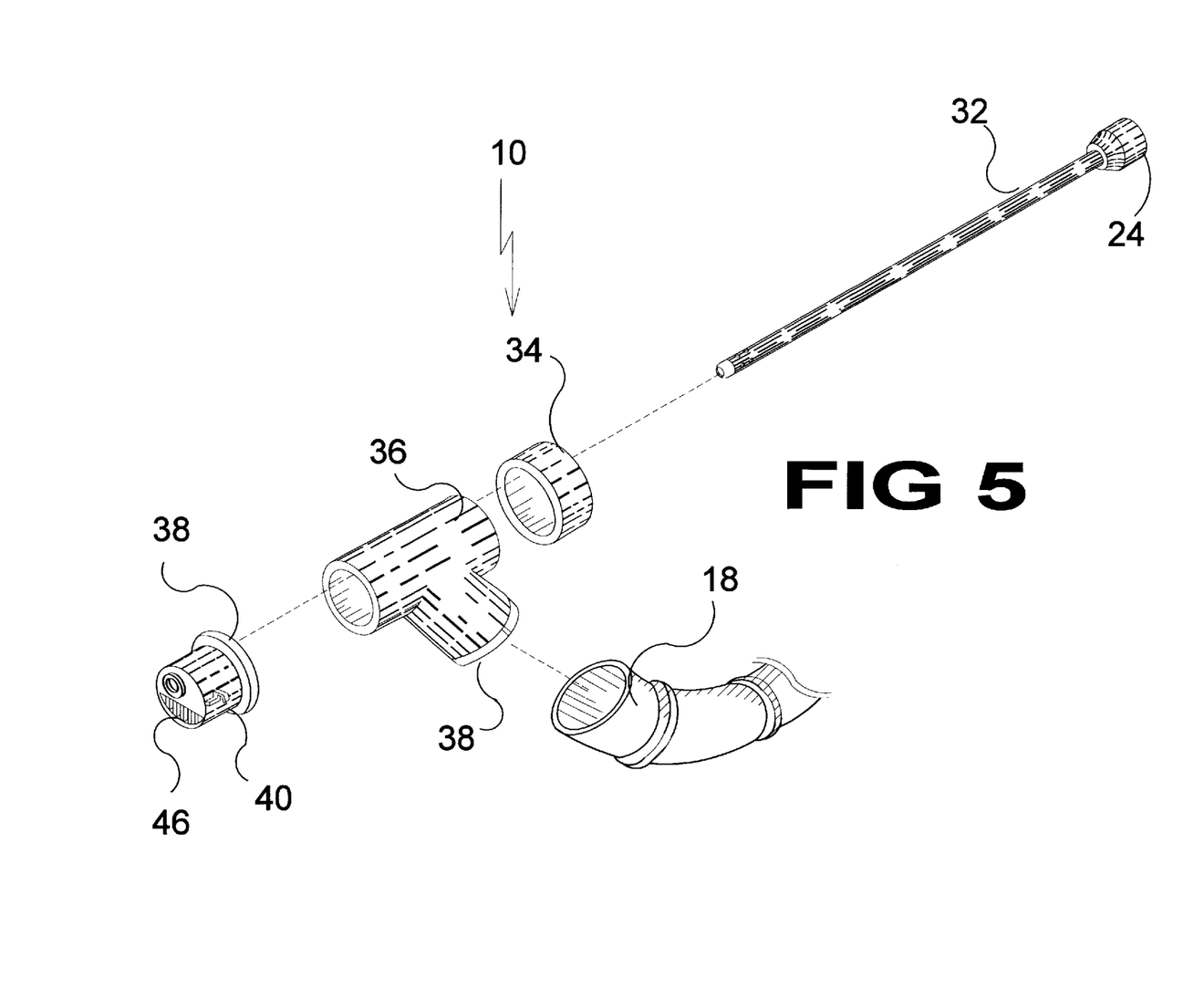
FIG. 5 is an exploded view, shown is the linear displacement relations of the components that comprise said invention. Also shown is the displacement of the components that comprise said invention as they may be viewed in an assembly drawing.

Turning to FIG. 5, shown therein is an exploded view, showing the components that comprise the present invention 10. Also shown are the components that comprise the present invention 10 as they may be viewed in an assembly drawing. The elements shown have been previously disclosed.

Figure 6:
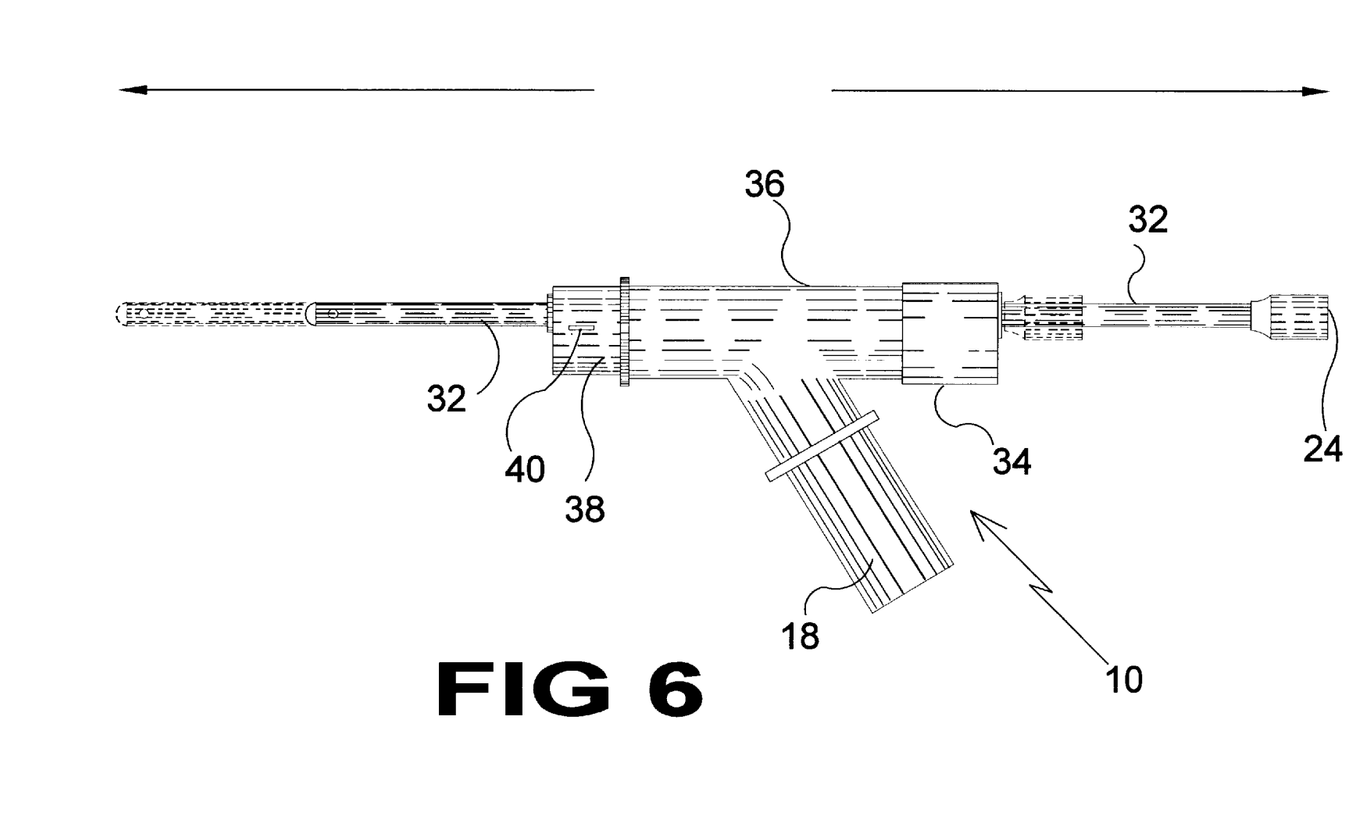
FIG. 6 is a side view, taken from FIG. 4 as indicated. Shown the linear displacement relations of the components that comprise the holding tank cleaning device. Also shown is the water extension wand as it traverses the entire length of the holding tank cleaning device. Shown also (represented by phantom lines) are the extendible qualities of the water extension wand that provides the means for water to access to the rear most section of a recreational vehicle holding tank.

Turning to FIG. 6, shown therein is a side view, taken from FIG. 4 as indicated. Shown is the water extension wand 32 as it traverses the entire length of the holding tank cleaning device 10. Shown also (represented by phantom lines) are the slidably extendable qualities of the water extension wand 32 within outlet element 36 that provides the means for water to access to the rear most section of a recreational vehicles holding tank (not shown). The elements shown have been previously disclosed.

Figure 7:
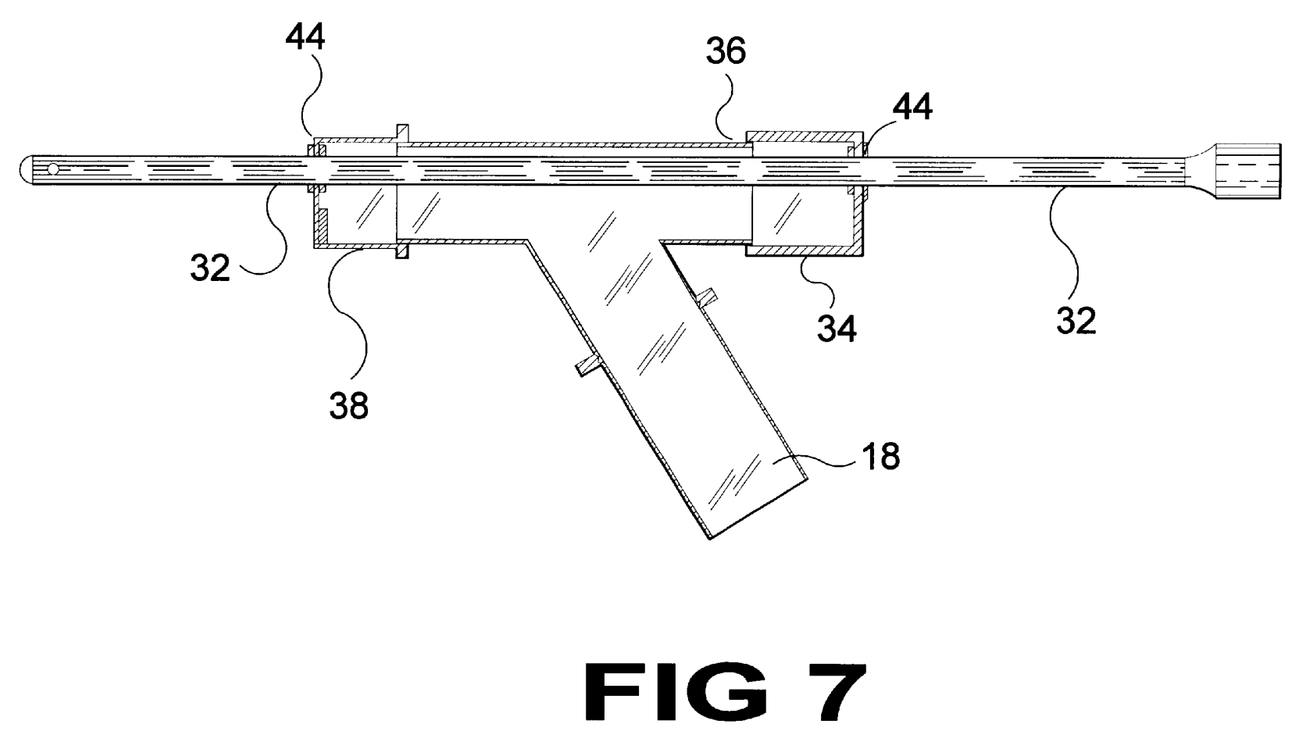
FIG. 7 is a sectional view, taken from FIG. 4 as indicated. Shown is the interior arrangement of the water extension wand as it transverses the entire body of the outlet element and is secured into place by the locking cap and the end cap.

Turning to FIG. 7, shown therein is a sectional view, taken from FIG. 4 as indicated. Shown is the interior arrangement of the water extension wand 32 as it transverses the entire body of the outlet element 36 and is secured into place by the locking cap 38 and the end cap 34. Also shown are a pair of rubber gasket O-rings 44 which are of conventional design. The O-rings 44 provide a means for a leak-resistant flow around the water extension wand as it slides through the apertures contained in the end cap 34 and the locking cap 38 wherein the O-rings 44 are located.

In operation, the user of the present invention 10 may selectively attach the present invention to the outlet valve of the recreational vehicle holding tank. The user of the present invention may then introduce pressurized water into the holding tank via the water hose as it works in conjunction with the water extension wand 32. The water extension wand 32 protrudes through the locking cap 38 and interfaces with the inner cavity of the holding tank. The volume of pressurized water is forced into the holding tank and thereby debris and wastewater are forced out of the holding tank via the aperture 46 into the outlet hose. The waste matter from the holding tank is flushed through the present invention, then through the outlet hose to the below ground or other type of septic tank.

What is claimed to be new and desired to be protected by Letters Patent is set forth in the appended claims:

1. An apparatus for flushing the wastewater holding tank of a recreational vehicle, a holding tank coupling being disposed on the holding tank, the coupling providing an inlet to the holding tank, comprising:
    a) a Y-shaped conduit element, said Y-element having a first end, a second end, and a third end;
    b) an end cap disposed on said first end of said Y-shaped conduit, said end cap having an aperture in the end thereof;
    c) means for a locking cap disposed on said second end of said Y-shaped conduit whereby said locking cap can be attached to the holding tank coupling, said locking cap having a first aperture in the end thereof, said locking cap having a second aperture in the end thereof for outflow of the wastewater;
    d) an outlet disposed on said third end of said Y-shaped conduit, said outlet for conveying flow from the holding tank;
    e) an elongated tubular extension wand disposed internal said Y-shaped conduit, said wand having an inlet for inflow of water and an outlet for outflow of water;
    f) a first means for connecting a pressurized source of water to said inlet of said extension wand; and,
    g) a second means for connecting an outlet hose to said outlet of said Y-shaped conduit.

2. The apparatus of claim 1, wherein said extension wand extends through said first end and said second end of said Y-shaped conduit.

3. The apparatus of claim 2, wherein said end cap further comprises an O-ring disposed in said end cap aperture, said O-ring complementarily sized to receive and seal said elongated tubular extension wand therein.

4. The apparatus of claim 3, wherein said locking cap further comprises an O-ring disposed in said locking cap aperture, said O-ring complementarily sized to receive and seal said elongated tubular extension wand therein.

5. The apparatus of claim 4, wherein said first means for connecting a source of water to said extension wand further comprises an intake hose coupling disposed on said inlet of said extension wand.

6. The apparatus of claim 4, wherein said first means for connecting a source of water to said extension wand further comprising a mating coupling disposed on an intake hose for mating to said intake hose coupling.

7. The apparatus of claim 6, wherein said extension wand is slidable within said Y-shaped conduit.

8. The apparatus of claim 7, wherein said outlet of said extension wand further comprises a plurality of apertures in the end thereof.

9. The apparatus of claim 8, wherein said apertures are oriented in various directions so that water is sprayed about the holding tank.

10. The apparatus of claim 9, wherein said means for a locking cap further comprises a locking element disposed on the outer surface thereof for locking onto the holding tank coupling.

11. The apparatus of claim 10, wherein said second aperture of said locking cap further comprises a filter for removing objects from the wastewater outflow.

12. The apparatus of claim 11, wherein said second means for connecting an outlet hose to said outlet of said Y-shaped conduit further comprises a locking clamp disposed about an outlet hose and said outlet of said Y-shaped conduit.

13. The apparatus of claim 12, wherein said O-rings are made of rubber.

14. The apparatus of claim 13, wherein said Y-shaped conduit has a thin wall.

15. The apparatus of claim 14, further comprising an outlet hose for conveying wastewater from said outlet to a wastewater receptacle.

16. The apparatus of claim 15, wherein said extension wand is complementarily longitudinally sized to the holding tank.

17. The apparatus of claim 16, wherein said extension wand is flexible.

* * * * *